Patented Nov. 15, 1938

2,136,928

UNITED STATES PATENT OFFICE 2,136,928

MANUFACTURE OF AMINES OF HIGH MOLECULAR WEIGHT, WHICH ARE RICH IN NITROGEN

Paul Schlack, Berlin-Treptow, Germany, assignor to I. G. Farbenindustrie Aktiengesellschaft, Frankfort-on-the-Main, Germany, a corporation of Germany No Drawing. Application December 9, 1935, Serial No. 53,613. In Germany December 10, 1934

9 Claims. (Cl. 260—2)

This invention relates to a process of producing resinous amines, which are rich in nitrogen.

Substances of high molecular weight having a high content of basic nitrogen, in particular such as are not decomposed by strong acids or alkalies, are only known in a comparatively small number, which is still more limited as soon as the solubility in certain organic solvents is desired.

It is therefore an object of the present invention to provide an improved process of producing resinous amines.

A further object of the invention is the provision of a new kind of resinous amines which are stable against the action of strong acids or alkalies and which are soluble in certain organic solvents.

Further objects of the invention will appear from the following detailed specification.

According to the present invention it has been found that highly molecular, strongly basic polyamines and derivatives thereof, whose solubility in various solvents may, if desired, be regulated to a great extent, can be obtained by reacting at room temperature or at a raised temperature with ammonia or, particularly, with mono- or polyamines or their salts having at least 2 reactive positions at the basic nitrogen, on a compound of relatively low molecular weight having more than one alkylene oxide and/or alkylene imine and/or alkylene sulfide radical in its molecule. If free bases are used for the reaction, two or more replaceable hydrogen atoms must be linked to the nitrogen atom or atoms. As has been found in the case of salts, for example chlorides, tertiary polyamines may also be employed for reaction.

Polyvalent alkylene oxides which come into question for the present invention, are, for example, butadiene dioxide, isoprene dioxide, diallyl dioxide, diglycid ether, diglycidthio-ether, limonene dioxide, the dioxides derived from dichlorhydrin mannite, from the glycollic ester of crotonic acid or from dicrotonyl ethylenediamine, p-phenylene-di-hydroxypropeneoxide, 2.7-naphthylene-di-hydroxypropeneoxide, di-propene-oxides from p-di-hydroxy-diphenyl propane or from di-resorcinyl acetic acid, tetramethyl-piperazino-di-propene oxide.

The polyvalent alkylene oxides and their analogues can be obtained according to known methods, for example by adding hydrochlorous acid to dienes or polyenes and then splitting off the hydrogen chloride by the addition of alkaline substances, by the reaction of phenolates with epihalohydrins, or by direct oxidation of olefines, for example by means of per-acids according to the method of Prileshajew (see Chem. Zentralblatt, 1911, II, p. 1279). Polyvalent alkylene imines can be obtained from alkyl polyamine halides by splitting off hydrogen halide by means of alkalies. The quaternary compounds which may also be employed, are obtained by transforming the free halogen alkyl bases, for example, by transforming NN'-β-chloroethyl-piperazine or NN'-di-chlor-β-hydroxypropyl-piperazine. The transformation occurs very easily if the chlor-alkyl bases are liberated by an alcoholic or an alcoholic aqueous solution of alkali. The alkalinity of the solution becomes neutral after twelve to twenty-four hours and therefore contains only the quaternary product. The reaction can be hastened by heating.

Alkylenesulfides are produced by the reaction of alkylene oxides on substances which split off sulfur, such as thiocyanates and thioureas. The formation of sulfide can be tied up with the reaction on the amines in one operation, for instance, if the thiocyanates of the bases are used.

The following amines or their derivatives are suitable for reaction with substances of the kind described above: ethylamine, cyclohexylamine, dimethylamine chlorhydrate, benzylamine, dodecylamine, symmetrical dimethylethylenediamine, tetramethylethylenediamine-chlorhydrate, dodecylethylene-diamine, β-diethylamine-ethylene diamine, s-di-ethoxy-ethylene diamine, piperazine, triethylene tetramine, amino acetic acid, amino acetic acid-n-propyl ester, amino-ethane sulfonic acid, guanidine and the anhydro products obtained from 2 mols of acetylacetone or acetyl acetic acid ester and 1 mol of triethylene tetramine.

By the reaction of substances having two alkylene oxide, alkylene sulfide or alkylene imine groups with free amines, in which only 2 replaceable hydrogen atoms are connected with the basic nitrogen, such as primary monoamines, primary-tertiary diamines or di-secondary diamines, compounds with more or less long chains are obtained, which have, or at least primarily have, no lateral branching and are readily soluble in organic solvents.

Especially reactive products suitable for further reaction, are obtained by employing polyamines, in which one or more primary or secondary amino groups are withdrawn from the reaction in a reversible manner, for example by substituting acyl groups or by condensation, particularly with carbonyl compounds. These amino groups can be set free again by hydrolysis or reduction. Unless these operations occur under very mild conditions, this modification of the process is preferably used when no groups which can be easily saponified, particularly ester groups, are present in the original chains.

The solubility and the chemical character of the condensation products can be influenced to a marked extent by the subsequent introduction of various radicals. Products having primary and secondary amino groups may be acylated or alkylated, in which case the introduced substituents may contain various radicals, such as carboxylic or sulphonic acid groups or also basic groups, and radicals which can be converted into basic groups. Condensation products having tertiary nitrogen may be converted into quaternary compounds by means of alkylation or by treating them with hydrogen peroxide, whereby the solubility in water is improved or is attained in other cases. For these secondary reactions, there come into consideration: acylating substances, such as acid chlorides, for example acetyl chloride, chloroacetyl chloride, toluene-sulfo-chloride or chloromethylbenzene sulfo-chloride, acid anhydrides, isocyanates, mustard oils and ketenes, as well as alkylating substances, such as ethylbromide, glycerine monochlorhydrin, ethylene oxide, dimethyl sulfate, toluene sulfonic acid methyl ester chloracetic acid and chlorethane sulfonic acid.

According to the working conditions and to the structure of the products, alcoholic hydroxyl or sulfhydryl groups can also be acylated, alkylated (oxalkylated) or acetylated together with or instead of the amino or imino groups. Subsequently, the O-acyl groups, for example the acetyl groups, may also be partly split off again by hydrolysis in order to influence the solubility.

The solubility of the products in water may easily be attained, as already mentioned above, by alkylating the products up to the quaternary ammonium salt, or by the reaction of the primary products of reaction with alkylene oxides or by condensation with polyvalent alcohols, polyglycerines, polyglycols. The solubility, in particular in alkaline media, is also effected by converting primary or secondary amino groups in a known manner into thiocarbaminates by means of carbon disulfide and alkaline metal, or by transforming them into amide sulfonic acid groups by means of sulfur trioxide or chlorosulfonic acid. Solubility particularly in alkaline media may also be attained by condensation with acid carbonyl compounds, for example with benzaldehyde sulfonic acid. In some cases, the compounds containing hydroxyl groups may also be xanthated. In the latter cases, the acid groups improving or provoking solubility may easily be split off subsequently. Part of the polyamines may be directly dissolved in copper oxide ammonia.

The products obtained according to this invention are resinous substances without definite melting points. According to the constituents forming the compounds they have very different physical properties. The products obtained by reacting aliphatic amines, such as ethylamine, cyclohexylamine, piperazine or tetramethylethylene-diamine-dichlorhydrate, are viscous liquids or have the character of soft resins. Condensation products in which annular radicals are contained are harder and more brittle, particularly if aromatic components are present. The product obtained by condensing an equal number of molecules of butadiene dioxide and cyclohexylamine is a brittle pulverizable resin of amber-like color.

The new polyamines and their conversion products may be employed for numerous purposes in the form of free bases or in the form of salts together with organic or inorganic acids. They are useful in the textile industry and the related branches of the chemical technology, particularly as coloring and printing assistants, for example in the form of a mordant or fixing agent for dyestuffs, as a thickening agent for vat dyestuffs, furthermore as an addition to finishings, preparations, dressing and so on. Other applications are, for example, the manufacture of insecticides, adhesives, plastic masses and pharmaceutica.

The products according to the present invention can be obtained as the substance per se, as well as in the form of a deposit or constituent on or in substrata, such as varnishes, plastic masses, spinning and molding solutions, fibers, yarns, fabrics, paper, leather or other shaped articles. They can also be chemically aftertreated on or in these products, in particular with alkylating agents. The final products obtained have new, valuable properties, in particular they show an essentially improved absorption capacity for dyestuffs, dyestuff derivatives, dyestuff components, tanning materials, mordants and other treating agents, especially for such as have an acid character. The addition of the new polyamines or their soluble derivatives, also of those which have salt character, to spinning solutions of artificial silk, in particular to spinning solutions consisting of organophil highly polymeric compounds, such as cellulose acetate, according to my co-pending application Ser. No. 47,638, filed Octber 31, 1935, is especially important. All possibilities described therein may correspondingly be applied to artificial articles together with an addition of the products obtained according to this invention. For example, acetate silk containing from 7 to 10 per cent of a polyamine obtained from diglycide and piperazine, may be subjected to a partial saponification, whereupon the fibers can be dyed with any desired wool dyestuff.

If it is desired to deposit the polyamines in an insoluble state on cellulose products, such as cellulose artificial silk, cotton or paper, for the purpose of animalization, there are preferably employed components having more than 2 reactive positions, in order to attain a branching as far as possible which leads to the formation of insoluble resins. The proportions are particularly favorable, if one of the components, either the amine or the polyvalent alkylene oxide or an analogue thereof, is brought to reaction in the gaseous state. In this case, the reaction can be improved by employing the pulsating process according to my co-pending application Ser. No. 46,445, filed October 23, 1935. In this case as well as in the foregoing cases the deposits on or in the materials can still be converted subsequently into quaternary products by a further alkylation. Thus, the fixation of dyestuffs is still essentially improved. Quaternary salts can directly be produced by the use of amine salts.

Products containing mercapto groups are capable of further change with the formation of disulfide. This process can be very desirable, since the products formed are more strongly retained on the substrate. A premature conversion, however, often shows drawbacks and must be prevented by additions of antioxygens and/or by agents reducing disulfides. Mercapto groups are also valuable in all cases in which solubility in alkaline media is desired or necessary.

The fixation of the resinous polyamines on substrata may also be improved by the pre- or after-treatment with precipitating agents, such as phosphoric tungstic acid, artificial or natural tanning agents, phenols containing sulfur and other substances having a similar effect. Finally, the fixation may also be assisted by adding, during the formation of resins, agents effecting the formation of chains in another direction, in particular aldehydes or substances splitting off aldehydes, such as formaldehyde and hexamethylenetetramine. Simultaneously substances can be added, which do not react at all or without further additions with the alkylene-oxides and their analogues, but which are capable of condensation together with carbonyl compounds, in particular aldehydes, such as ureas and urea derivatives, for example ordinary urea, thiourea or dicyandiamide as well as phenols or sulfamides. If the process is not carried out with free amines, but wholly or partly with the salts thereof, the condensation may be effected at any pH-value.

*Example 1.*—1 molecular proportion of diglycid ether in 90 per cent alcoholic solution is combined with 1 molecular proportion of piperazine while cooling and, after standing for one hour, the mixture is heated to boiling for some hours. After distilling off the solvent, a tough, slightly colored resin is obtained, which is soluble in dilute acetic acid and in many organic solvents. The resin may be added to a spinning solution of acetyl cellulose in a quantity of, for example, from 5 to 10 per cent, calculated with reference to the cellulose acetate.

*Example 2.*—The tetra methyl piperazinodipropene oxide obtainable from di-$\gamma$-chloro-$\beta$-propylhydroxy-piperazine by boiling this compound with powdered potassium hydroxide in ether, is converted by means of 1 molecular proportion of symmetrical di - hydroxy - ethylethylenediamine. The resulting, strongly basic resin can further be alkylated with dimethyl sulfate.

*Example 3.*—Viscose silk is impregnated with a 10 per cent solution of diethylenetriamine and then after-treated with erythrene dioxide under lower pressure. A strongly basic resin is formed on the fibre, which has a high affinity for acid wool-dyestuffs. Instead of diethylenetriamine, the hydrochloric acid salt or a mixture of amine and hydrochloric acid salt may be employed.

*Example 4.*—Limonene dioxide, obtained according to Prileshajew (see Chem. Zentralblatt, 1911, II, p. 1279), is reacted with piperazine in 90 per cent alcoholic solution. This product may be combined with cellulose ethers.

What I claim is:

1. A process of producing a resinous amine rich in nitrogen, which comprises reacting a compound selected from the group consisting of alkylene polyoxides, alkylene polyimines and alkylene polysulfides with a compound selected from the group consisting of ammonia, mono- and polyamines and their salts containing at least two replaceable hydrogen atoms linked to nitrogen, said nitrogen being linked to saturated carbon atoms.

2. A process of producing a resinous amine rich in nitrogen, which comprises reacting a compound selected from the group of alkylene polyoxides, alkylene polyimines and alkylene polysulfides with a salt of a secondary amine, the nitrogen atom of which is linked to saturated carbon atoms.

3. A process of producing a resinous amine rich in nitrogen, which comprises reacting a compound selected from the group consisting of alkylene polyoxides, alkylene polyimines and alkylene polysulfides with a salt of a tertiary polyamine containing at least two replaceable hydrogen atoms linked to nitrogen, said nitrogen being linked to saturated carbon atoms.

4. A process of producing a resinous amine rich in nitrogen, which comprises reacting a compound selected from the group consisting of alkylene polyoxides, alkylene polyimines and alkylene polysulfides with a polyamine in which the basic nitrogen atom is substituted by at least two replaceable hydrogen atoms and by hydrolyzable groups, said basic nitrogen being otherwise linked to saturated carbon atoms.

5. A process of producing a resinous amine rich in nitrogen, which comprises reacting a compound selected from the group consisting of alkylene polyoxides, alkylene polyimines and alkylene polysulfides with a polyamine in which, besides at least two replaceable hydrogen atoms, hydrolyzable groups obtained by reacting said polyamine with a compound selected from the group consisting of acyl and carbonyl compounds are linked to nitrogen, the amino nitrogen being otherwise linked to saturated carbon atoms.

6. A process of producing a resinous amine rich in nitrogen, which comprises reacting a compound selected from the group consisting of alkylene polyoxides, alkylene polyimines and alkylene polysulfides with a compound selected from the group consisting of ammonia, mono- and polyamines and their salts containing at least two replaceable hydrogen atoms linked to nitrogen, said nitrogen being linked to saturated carbon atoms, and subjecting said highly molecular amine to a chemical after-treatment with an agent selected from the group consisting of alkylating and acylating agents.

7. A process of producing a resinous amine rich in nitrogen, which comprises reacting on substrata a compound selected from the group consisting of alkylene polyoxides, alkylene polyimines and alkylene polysulfides with a compound selected from the group consisting of ammonia, mono- and polyamines and their salts containing at least two replaceable hydrogen atoms linked to nitrogen, said nitrogen being linked to saturated carbon atoms.

8. A process of producing a resinous amine rich in nitrogen, which comprises reacting in substrata a compound selected from the group consisting of alkylene polyoxides, alkylene polyimines and alkylene polysulfides with a compound selected from the group consisting of ammonia, mono- and polyamines and their salts containing at least two replaceable hydrogen atoms linked to nitrogen, said nitrogen being linked to saturated carbon atoms.

9. A resinous amine rich in nitrogen obtained by reacting a compound selected from the group consisting of alkylene polyoxides, alkylene polyimines and alkylene polysulfides with a compound selected from the group consisting of ammonia, mono- and polyamines and their salts containing at least two replaceable hydrogen atoms linked to nitrogen, said nitrogen being linked to saturated carbon atoms.

PAUL SCHLACK.